May 11, 1926.

J. M. BARDERA

GAS COCK

Filed Oct. 23, 1922

1,584,270

INVENTOR
JOSE MARTINEZ BARDERA
BY
ATTORNEY

Patented May 11, 1926.

1,584,270

UNITED STATES PATENT OFFICE.

JOSE MARTINEZ BARDERA, OF NEW YORK, N. Y.

GAS COCK.

Application filed October 23, 1922. Serial No. 596,297.

This invention relates to gas cocks. More particularly it is directed to gas cocks in which provision is made for preventing accidental opening of the cock by jarring or otherwise.

One object thereof is to provide in a gas cock practical means for preventing the gas cock from being accidentally opened from closed position, which means shall be adapted to be released simultaneously with the opening of the cock when desired.

Another object of this invention is to provide a device of the character described which is simple in construction, comparatively cheap to manufacture and readily manipulated.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention, Fig. 1 is a front elevational view of an embodiment of the invention applied to the usual gas tip light fixture;

Figure 1:
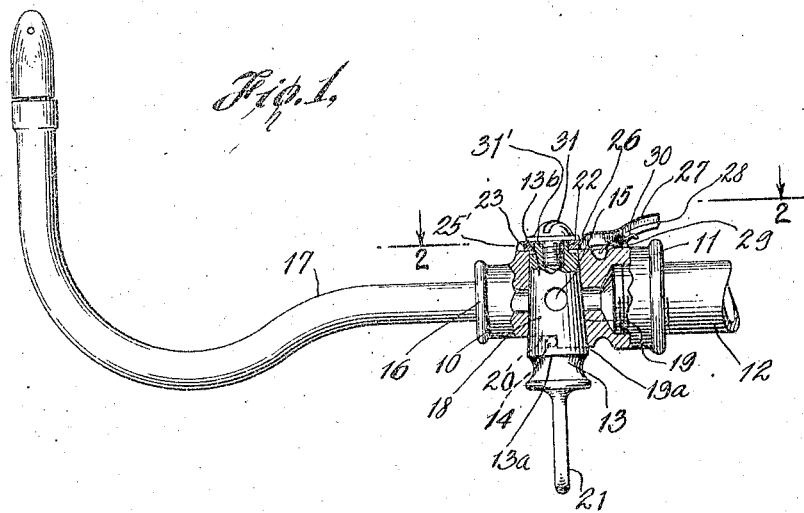
Figure 2:
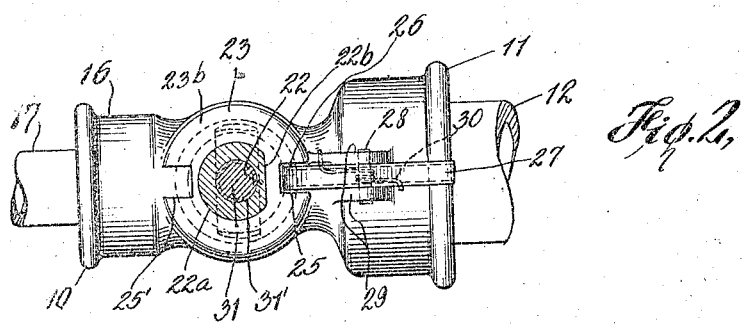
Fig. 2 is a sectional view cut along line 2—2 of Fig. 1.

Referring in detail to the drawing, 10 indicates a gas cock of the usual construction having the interiorly threaded hub 11 for the gas supply pipe 12. 13 indicates the gas cock key provided with the usual stop pin 14, and having the opening 15 wherethrough the gas may pass when desired, and the hub 16 for connecting the gas fixture 17 to the gas cock. The gas cock key 13 comprises the conical body portion 18, accurately ground for rotating snugly in the corresponding conical shaped opening 19 of the gas cock. The opening 19 extends transversely of the hub portions of the gas cock and is provided at one end 19ª thereof with a cut-away portion 20 adapted to co-act with the pin 14 extending from the key 13 for preventing the latter from making a complete instead of a semi-turn.

Figure 3:
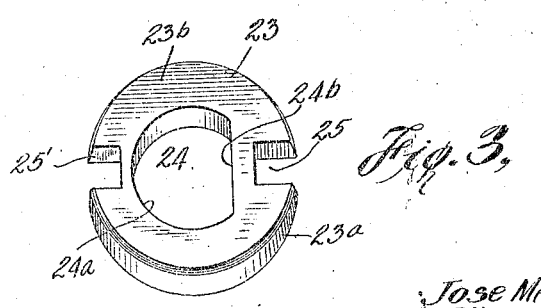
Fig. 3 is a perspective view of the washer for the key.

The gas cock 13 has extending from one end 13ª thereof the usual finger piece 21 and is provided at the other end 13ᵇ with a short spindle member 22 for holding the washer 23. The latter is formed preferably as shown in Fig. 3 with an opening 24 partly cylindrical as at 24ª and partly flat as at 24ᵇ. The spindle member 22 corresponds in cross-section to the opening 24 and similarly comprises the cylindrical portion 22ª and the flat portion 22ᵇ, so that when the key is turned the washer 23 will turn with it. The washer 23 is further provided with diametrically opposed slots 25, 25′ extending inwardly from the exterior wall 23ª of the washer. These slots are adapted to receive the pin 26 extending from the thumb lever 27, disposed adjacent the washer and pivoted by means of a pin 28 in an upstanding bearing 29 formed on the hub 11. A spring 30 is provided for normally maintaining the lever in engaging position. The pin 26 of the lever rests on the upper surface 23ᵇ of the washer and drops into either of the slots 25, 25′ when the latter are disposed thereunder, thus preventing the washer and the gas cock key from being jarred or turned into open position except when the pin 26 is raised, by pressing down on the lever 27. For holding the washer in position, the screw 31 is provided which enters the threaded opening 31′ formed in the gas cock key.

It will be clear, of course, that in assembling the gas cock the washer 23 will be so positioned as to dispose the slots 24, 25 in position to engage the pin 26 when the opening 15 of the key 13 is not in communication with the opening of the hub 11.

It will be noted also that in the practical use of the gas cock where it is desired to turn the gas on, the finger piece 21 and the thumb lever 27 may both be grasped simultaneously with the fingers of the same hand so that the finger piece 21 may be turned at the same time that a finger depresses the thumb lever 27 and releases the washer 23.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

A safety gas cock comprising a casing having threaded hub end portions, a rotatable key secured in said casing between said end portions, said key having a shut off body portion, a finger piece formed integral with the body portion at one end thereof and a spindle on the other end of said body portion arranged to extend through the casing, a stop-pin secured to the body portion adjacent said finger piece for engaging with a portion of the casing to positively stop the key in closed position, a single flat washer mounted on the end of the spindle, said washer having an opening therein shaped partly cylindrical and partly flat, and two diametrical slots extending inwardly from the rim of the washer on each side of said flat opening portion, the end of the spindle being shaped to correspond with said opening for retaining the washer to move therewith, a pin to releasably engage with said slots for positively locking the key in closed position, a spring pressed thumb-lever disposed longitudinally of said casing to lift said pin out of engagement with said slots for releasing the key, and an upstanding bearing on the threaded hub portion of the casing to pivotally support said thumb-lever.

In testimony whereof I affix my signature.

JOSE MARTINEZ BARDERA.